US012775138B2

(12) United States Patent
Mouri et al.

(10) Patent No.: US 12,775,138 B2
(45) Date of Patent: Oct. 27, 2026

(54) FUSION SPLICER

(71) Applicant: SUMITOMO ELECTRIC INDUSTRIES, LTD., Osaka (JP)

(72) Inventors: Shintaro Mouri, Osaka (JP); Soichi Endo, Osaka (JP); Akinori Kimura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 214 days.

(21) Appl. No.: 18/291,251

(22) PCT Filed: Aug. 1, 2022

(86) PCT No.: PCT/JP2022/029512
§ 371 (c)(1),
(2) Date: Jan. 23, 2024

(87) PCT Pub. No.: WO2023/013591
PCT Pub. Date: Feb. 9, 2023

(65) Prior Publication Data

US 2025/0102735 A1 Mar. 27, 2025

(30) Foreign Application Priority Data

Aug. 4, 2021 (JP) ................................ 2021-128213

(51) Int. Cl.
*G02B 6/255* (2006.01)
*G02B 6/02* (2006.01)

(52) U.S. Cl.
CPC ....... *G02B 6/2553* (2013.01); *G02B 6/02042* (2013.01); *G02B 6/2555* (2013.01)

(58) Field of Classification Search
CPC .................................................... G02B 6/2555
See application file for complete search history.

(56) References Cited

U.S. PATENT DOCUMENTS 4,825,092 A * 4/1989 Mehadji ............... G02B 6/2551 356/73.1
9,541,707 B2 1/2017 Saito et al.
(Continued)

FOREIGN PATENT DOCUMENTS

CN 101630041 A 1/2010
EP 0707226 A1 4/1996
(Continued)

OTHER PUBLICATIONS

International Search Report issued in Patent Application No. PCT/JP2022/029512 dated Oct. 11, 2022.

*Primary Examiner* — Lisa M Caputo
(74) *Attorney, Agent, or Firm* — McDonald Hopkins LLC

(57) ABSTRACT

A fusion splicer according to one embodiment is a fusion splicer that fusion-splices a first end surface of a first optical fiber and a second end surface of a second optical fiber to each other. An axis of the first optical fiber coincides with an axis of the second optical fiber. The fusion splicer includes a first rotation mechanism that rotates the first optical fiber about the axis; a second rotation mechanism that rotates the second optical fiber about the axis; a microscope that captures images of the first end surface and the second end surface; and a display unit that displays a first image of the first end surface captured by the microscope and a second image of the second end surface captured by the microscope in such a manner that the first image is superimposed on the second image in a distinguishable manner.

9 Claims, 12 Drawing Sheets

(56) References Cited

U.S. PATENT DOCUMENTS

| | | | |
|---|---|---|---|
| 2009/0232458 | A1 | 9/2009 | Hess et al. |
| 2015/0055923 | A1 | 2/2015 | Saito et al. |

FOREIGN PATENT DOCUMENTS

| | | | |
|---|---|---|---|
| JP | S58-214118 | A | 12/1983 |
| JP | S59-187306 | A | 10/1984 |
| JP | H05-150145 | A | 6/1993 |
| JP | H10-282354 | A | 10/1998 |
| JP | H10-332986 | A | 12/1998 |
| JP | 2013-050695 | A | 3/2013 |
| JP | 2015-114607 | A | 6/2015 |
| JP | 2018-004685 | A | 1/2018 |
| JP | 2020-086151 | A | 6/2020 |
| WO | 2013/077002 | A1 | 5/2013 |

* cited by examiner

FUSION SPLICER

TECHNICAL FIELD

The present disclosure relates to a fusion splicer.

Priority is claimed on Japanese Patent Application No. 2021-128213, filed on Aug. 4, 2021, the entire content of which is incorporated herein by reference.

BACKGROUND ART

Patent Literature 1 describes a fusion splicing method. In this fusion splicing method, a pair of V-groove stands in which a pair of respective optical fibers are placed, LED lamps disposed on the sides of the pair of respective optical fibers, and a first television camera and a second television camera that capture images of the pair of optical fibers are used. The LED lamps cause light to be incident on the optical fibers from the sides of the optical fibers. The light incident on the optical fibers from the sides is emitted from end surfaces of the optical fibers. The first television camera and the second television camera capture images of the end surfaces of the optical fiber that emit the light.

Patent Literature 2 describes a multicore fiber including a marker for alignment. The marker is provided on the multicore fiber at a position offset from the axis of line symmetry of a cross section. A refractive index of the marker is lower than a refractive index of cores and a refractive index of a clad. A hole is used as the marker. In a method for splicing the multicore fibers, light is incident from end surfaces on opposite sides of the multicore fibers of which end surfaces are disposed to face each other, and the disposition of the cores, the clads, and the markers is displayed on a monitor. By rotating one or both of the multicore fibers relative to each other such that the positions thereof are the same, the positions of the cores can be rotationally aligned. Thereafter, the two multicore fibers are moved in an axial direction to cause the multicore fibers to butt against each other, and the cores of the multicore fibers are fused.

CITATION LIST

Patent Literature

Patent Literature 1: International Publication WO 2013/077002

Patent Literature 2: Japanese Unexamined Patent Publication No. 2013-50695

SUMMARY OF INVENTION

A fusion splicer according to the present disclosure is a fusion splicer that fusion-splices a first end surface of a first optical fiber and a second end surface of a second optical fiber to each other. An axis of the first optical fiber coincides with an axis of the second optical fiber. The fusion splicer includes a first rotation mechanism that rotates the first optical fiber about the axis; a second rotation mechanism that rotates the second optical fiber about the axis; a microscope that captures images of the first end surface and the second end surface; and a display unit that displays a first image of the first end surface captured by the microscope and a second image of the second end surface captured by the microscope in such a manner that the first image is superimposed on the second image in a distinguishable manner.

DESCRIPTION OF EMBODIMENTS

Figure 1:
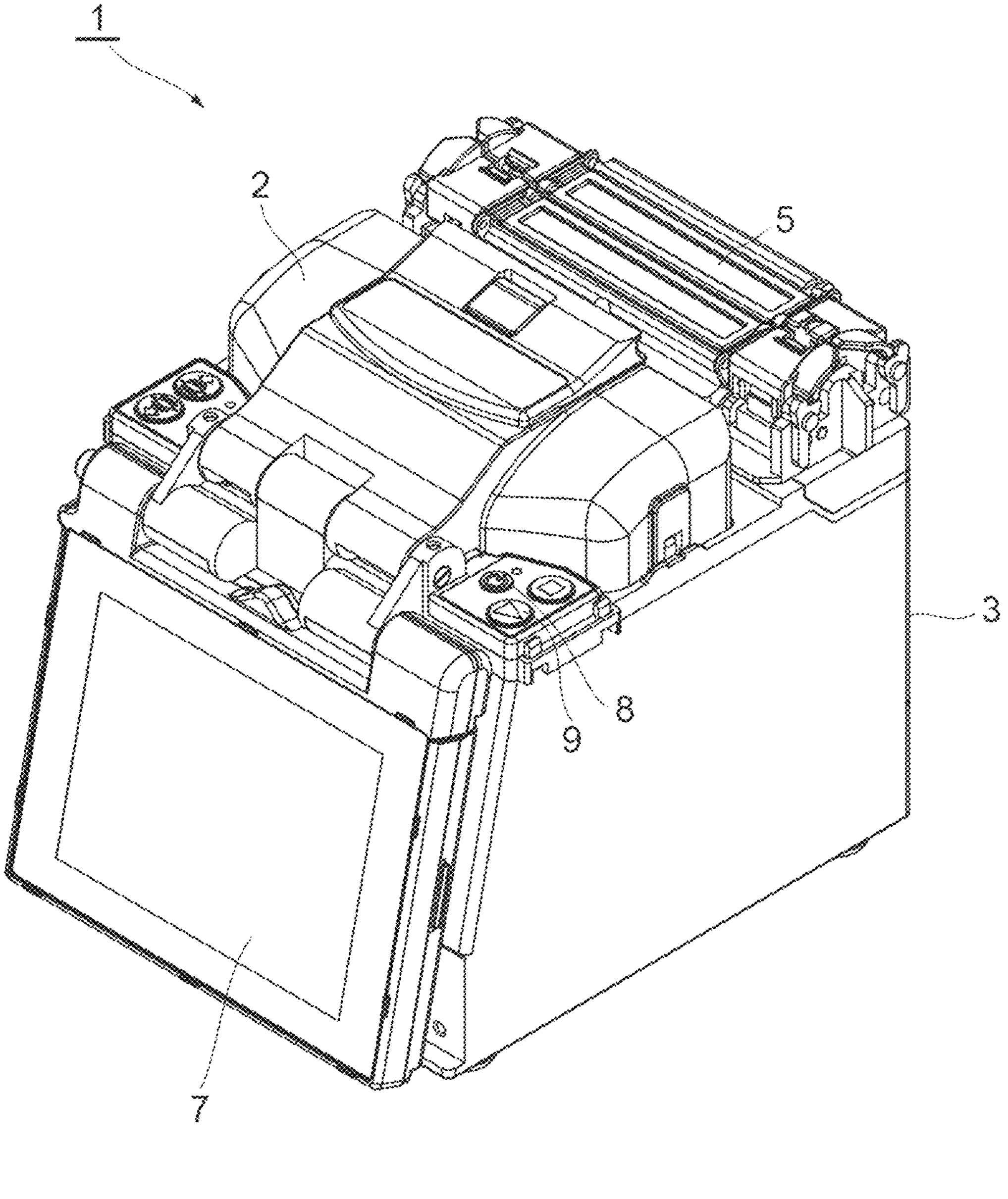
FIG. 1 is a perspective view showing a fusion splicer according to an embodiment.

The fusion splicer fusion-splices a pair of optical fibers, which require rotational alignment such as the above-described multicore fibers, to each other. The fusion splicer includes a camera that captures images of end surfaces of the optical fibers, and a monitor that displays the images captured by the camera. However, the monitor displays the images captured by the camera, as they are. Therefore, a worker who performs fusion splicing may not be able to accurately identify the positions of the end surfaces of the pair of optical fibers. In the work of rotating the optical fibers while looking at the images of the end surfaces, the worker may not be able to easily recognize the positions of the cores of the pair of optical fibers.

An object of the present disclosure is to provide a fusion splicer that allows the positions of cores of a pair of optical fibers to be easily recognized.

Description of Embodiment of Present Disclosure

Initially, the contents of an embodiment of the present disclosure will be listed and described. (1) A fusion splicer according to one embodiment is a fusion splicer that fusion-splices a first end surface of a first optical fiber and a second end surface of a second optical fiber to each other. An axis of the first optical fiber coincides with an axis of the second optical fiber. The fusion splicer includes a first rotation mechanism that rotates the first optical fiber about the axis; a second rotation mechanism that rotates the second optical fiber about the axis; a microscope that captures images of the first end surface and the second end surface; and a display unit that displays a first image of the first end surface captured by the microscope and a second image of the second end surface captured by the microscope in such a manner that the first image is superimposed on the second image in a distinguishable manner.

In the fusion splicer, the first end surface of the first optical fiber and the second end surface of the second optical fiber are fusion-spliced to each other. The fusion splicer includes the first rotation mechanism that rotates the first optical fiber about the axis, and the second rotation mechanism that rotates the second optical fiber about the axis. The fusion splicer includes the microscope that captures images of the first end surface of the first optical fiber and the second end surface of the second optical fiber. The fusion splicer includes the display unit that displays the first image of the first end surface and the second image of the second end surface, and the display unit displays the first image and the second image in such a manner that the first image is superimposed on the second image in a distinguishable manner. Since the first image and the second image are displayed in such a manner that the first image and the second image are superimposed in a distinguishable manner, the positions of the first end surface and the second end surface can be accurately identified. By displaying the first end surface and the second end surface in such a manner that the first end surface is superimposed on the second end surface, the positions of cores of the first optical fiber and cores of the second optical fiber can be easily recognized.

(2) In (1) described above, the display unit may display an X-axis extending in a direction orthogonal to the axes and a Y-axis extending in a direction orthogonal to both the axes and the X-axis, together with the first image and the second image. In this case, the positions in an X-axis direction and the positions in a Y-axis direction of the cores of the first optical fiber and the cores of the second optical fiber can be easily identified.

(3) In (1) or (2) described above, the display unit may display a specified location of the first image and the second image in an enlarged manner. In this case, since the display unit displays the specified location in an enlarged manner, the desired location of the cores of the first optical fiber and the cores of the second optical fiber can be more clearly displayed.

(4) In any one of (1) to (3) described above, where n is a natural number of 2 or more, the first optical fiber may be a multicore fiber including n first cores, and the second optical fiber may be a multicore fiber including n second cores. The display unit may display each number from 1 to n together with each of the n first cores, and display each number from 1 to n together with each of the n second cores. In this case, numbers from 1 to n are displayed together with the respective first cores, and numbers from 1 to n are displayed together with the respective second cores. Therefore, the positions of the first cores and the positions of the second cores can be more easily recognized.

(5) In (4) described above, the display unit may display an angle formed by a line segment connecting the first core numbered x and a center of the first end surface and a line segment connecting the second core numbered x and a center of the second end surface, where x is a natural number of 1 or more and n or less. In this case, since a deviation in the rotation position of the second cores with respect to the first cores can be identified from the displayed angle, the work of fusion-splicing the first optical fiber and the second optical fiber can be easily performed. It is possible to identify an angle by which the second optical fiber should be rotated with respect to the first optical fiber to allow the second core numbered x to be spliced to the first core numbered x.

(6) In (4) or (5) described above, the fusion splicer described above may further include a core selection unit that selects the second core spliced to the first core numbered x, where each of x and y is a natural number of 1 or more and n or less. The display unit may display an angle formed by a line segment connecting the first core numbered x and a center of the first end surface and a line segment connecting the second core selected by the core selection unit and numbered y and a center of the second end surface. In this case, the core selection unit can select the second core spliced to the first core numbered x. The angle formed by the line segment connecting the first core numbered x and the center of the first end surface and the line segment connecting the selected second core numbered y and the center of the second end surface is displayed. Therefore, it is possible to identify an angle by which the second optical fiber should be rotated with respect to the first optical fiber to allow the second core numbered y to be spliced to the first core numbered x.

(7) In any one of (1) to (6) described above, the fusion splicer described above may further include a rotation angle specifying unit that specifies a rotation angle of the first end surface about a center of the first end surface. The display unit may display the first end surface rotated by the rotation angle specified by the rotation angle specifying unit. In this case, since the first image rotated by the specified rotation angle is displayed, the state of the first end surface after rotation can be identified before the first optical fiber is actually rotated.

Details of Embodiment of Present Disclosure

A specific example of a fusion splicer according to an embodiment of the present disclosure will be described. In the description of the drawings, the same or corresponding elements are denoted by the same reference signs, and duplicate descriptions will be omitted as appropriate. For ease of understanding, the drawings may be depicted in a partially simplified or exaggerated manner, and dimensional ratios and the like are not limited to those shown in the drawings.

Figure 2:
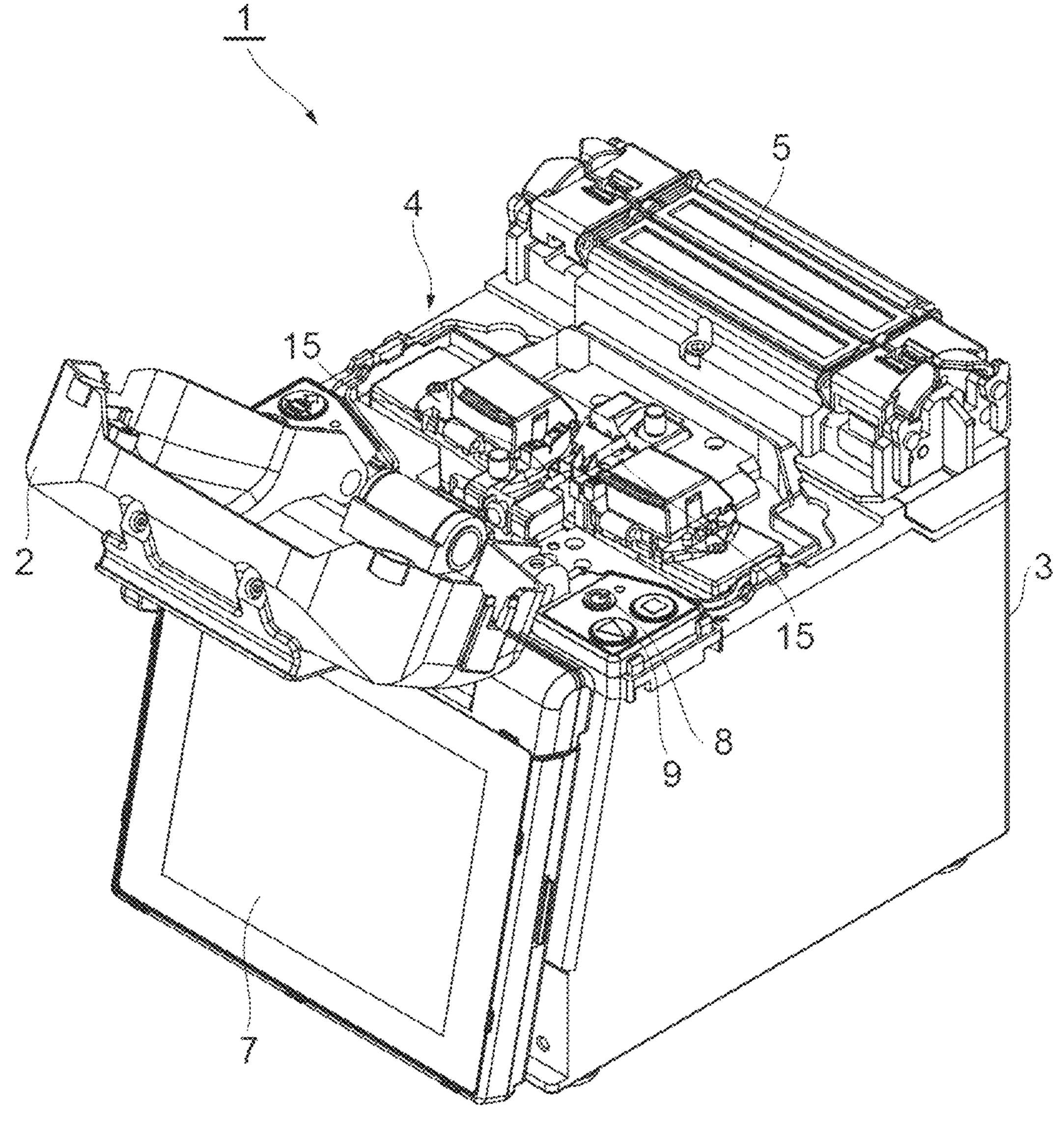
FIG. 2 is a perspective view showing an internal structure of the fusion splicer in FIG. 1.

FIG. 1 is a perspective view showing a fusion splicer 1 according to an embodiment. The fusion splicer 1 includes a windshield cover 2 on an upper portion thereof. FIG. 2 is a perspective view with the windshield cover 2 of the fusion splicer 1 open. As shown in FIGS. 1 and 2, the fusion splicer 1 includes a housing 3 having a box shape. A fusion splicing unit 4 that fuses optical fibers and a heater 5 that heats and shrinks a fiber reinforcing sleeve placed over spliced portions of the optical fibers fused in the fusion splicing unit 4 are provided at an upper portion of the housing 3. The windshield cover 2 is provided to prevent wind from entering the fusion splicing unit 4. The fusion splicer 1 includes a monitor 7 that displays an image of the state of fusion splicing of optical fibers captured by a microscope 18 (refer to FIG. 4) disposed inside the housing 3. The fusion splicer 1 includes a power switch 8 that turns on and off the power of the fusion splicer 1, and a splicing start switch 9 for performing fusion splicing of optical fibers.

Figure 3:
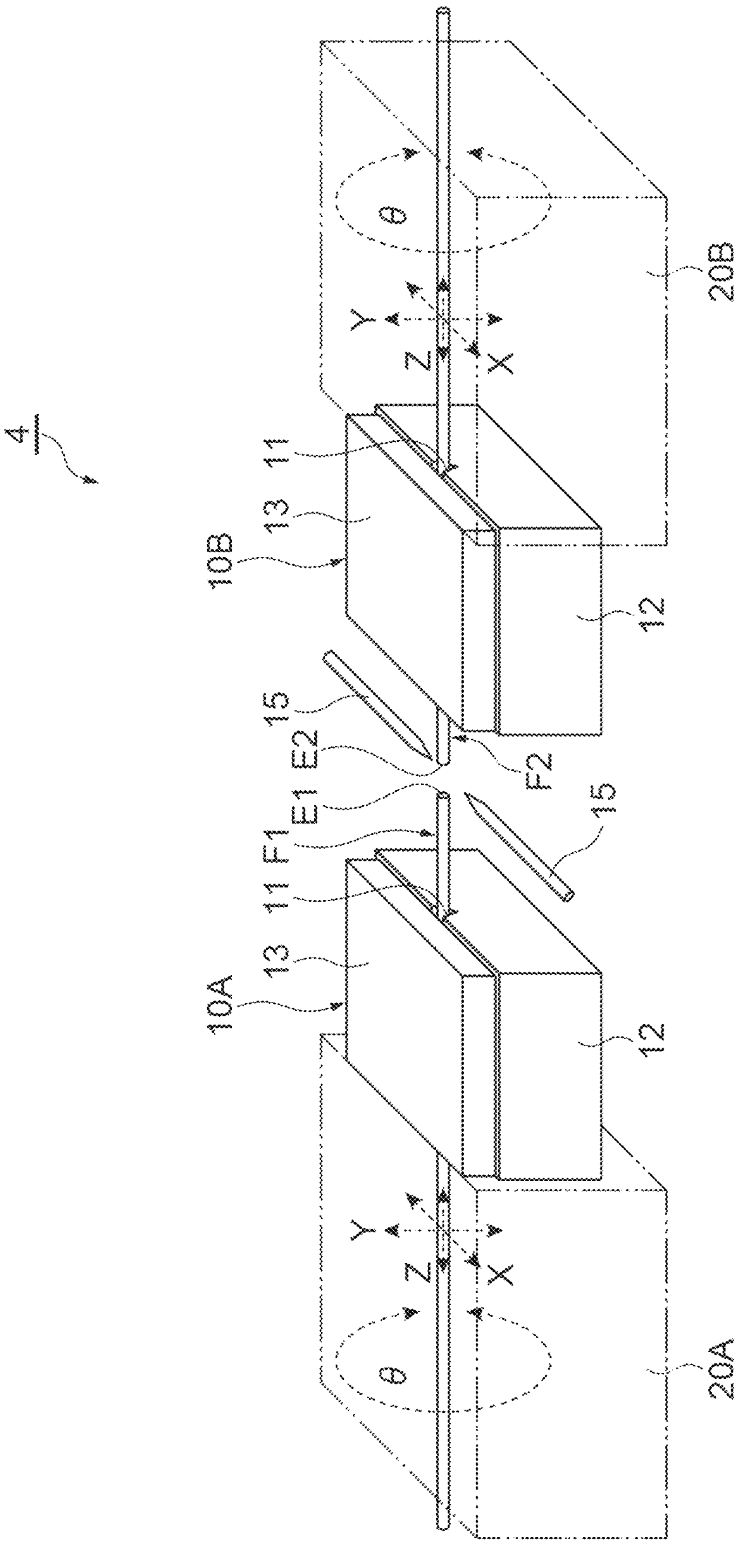
FIG. 3 is a view schematically showing a first rotation mechanism and a second rotation mechanism of the fusion splicer according to the embodiment.

FIG. 3 is a perspective view schematically showing the fusion splicing unit 4. As shown in FIGS. 2 and 3, the fusion splicing unit 4 fusion-splices a first optical fiber F1 and a second optical fiber F2 to each other. The fusion splicing unit 4 includes a first optical fiber holder 10A, a second optical fiber holder 10B, a first rotation mechanism 20A, and a second rotation mechanism 20B. The first optical fiber holder 10A holds the first optical fiber F1, and the second optical fiber holder 10B holds the second optical fiber F2. The first rotation mechanism 20A rotates the first optical fiber holder 10A, and the second rotation mechanism 20B rotates the second optical fiber holder 10B.

The first optical fiber F1 and the second optical fiber F2 are, for example, optical fibers that require rotational alignment in the fusion splicer 1. Namely, the first optical fiber F1 and the second optical fiber F2 are optical fibers that need to coincide with each other in position in a θ direction that is a direction about a Z-axis. For example, the first optical fiber F1 and the second optical fiber F2 are multi-core fibers (MCFs) or polarization maintaining fibers (PMFs).

A pair of discharge electrodes 15 are disposed at a position where a first end surface E1 of the first optical fiber F1 and a second end surface E2 of the second optical fiber F2 face each other. The pair of discharge electrodes 15 fuse the first end surface E1 of the first optical fiber F1 and the second end surface E2 of the second optical fiber F2 to each other through discharge. The pair of discharge electrodes 15 are disposed at positions where the pair of discharge electrodes 15 face each other along a direction intersecting the first optical fiber F1 and the second optical fiber F2 (for example, an X-axis direction).

The first optical fiber holder 10A and the second optical fiber holder 10B are lined up along a Z-axis direction that is a direction in which an axis of the first optical fiber F1 extends. The first rotation mechanism 20A and the second rotation mechanism 20B are lined up along the Z-axis direction. The first optical fiber holder 10A and the second optical fiber holder 10B include V-grooves 11 in which the first optical fiber F1 and the second optical fiber F2 is placed, respectively. The first optical fiber F1 is positioned in the V-groove 11 of the first optical fiber holder 10A, and the second optical fiber F2 is positioned in the V-groove 11 of the second optical fiber holder 10B. Each of the first optical fiber holder 10A and the second optical fiber holder 10B includes a stand 12 in which the V-groove 11 is formed, and a lid 13 placed on the stand 12. For example, the stand 12 and the lid 13 are disposed to line up along a Y-axis direction intersecting both the X-axis direction and the Z-axis direction.

Figure 4:
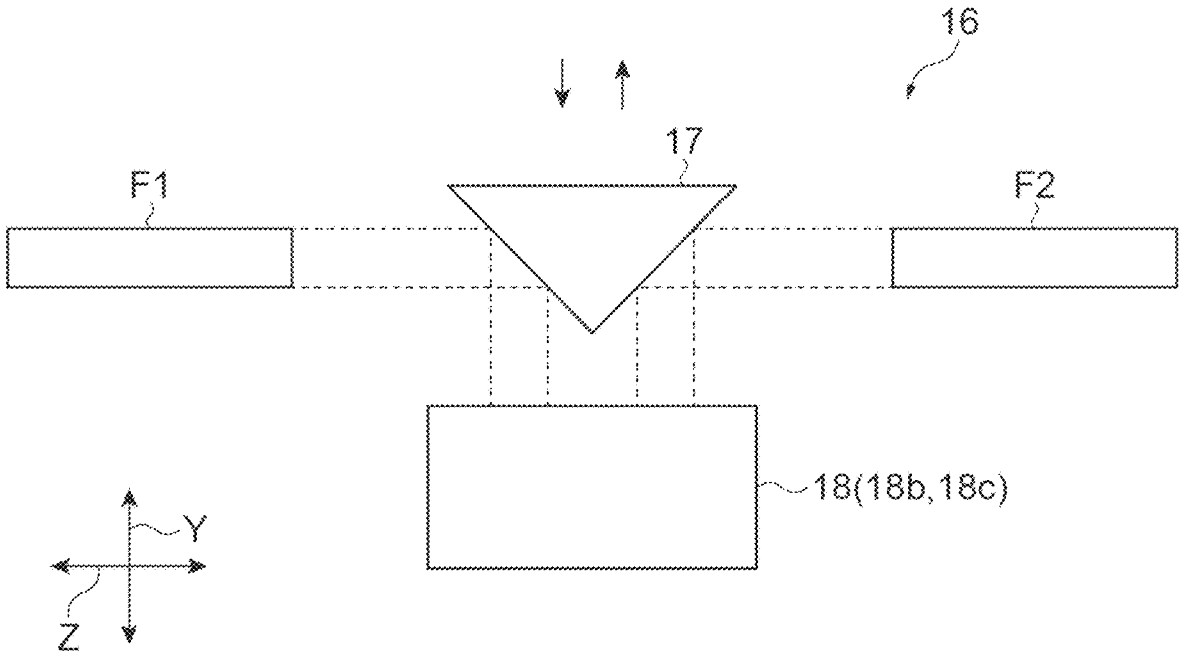
FIG. 4 is a view schematically showing an image observation mechanism of the fusion splicer according to the embodiment.

The fusion splicer 1 includes an image observation mechanism 16 that observes the first optical fiber F1 and the second optical fiber F2 disposed in the V-grooves 11. FIG. 4 shows a configuration of the image observation mechanism 16. The image observation mechanism 16 includes, for example, a mirror 17 and the microscope 18. The mirror 17 has, for example, a triangular prism shape. A cross-sectional shape of the mirror 17 in a Y-Z plane is an isosceles triangle. The mirror 17 extends in the X-axis direction. The mirror 17 has, for example, two surfaces inclined at 45 degrees with respect to both the Y-axis direction and the Z-axis direction. Each of the two surfaces is a reflection surface. For example, the mirror 17 is installed to be movable in the Y-axis direction at an intermediate position in the Z-axis direction in a state where respective central axes of the first optical fiber F1 and the second optical fiber F2 substantially coincide with each other.

Light incident on the first optical fiber F1 and the second optical fiber F2 from respective sides opposite to the end surfaces of the first optical fiber F1 and the second optical fiber F2 facing each other is emitted from the end surfaces on a side where the first optical fiber F1 and the second optical fiber F2 face each other. The microscope 18 observes the respective end surfaces of the first optical fiber F1 and the second optical fiber F2 by receiving the light reflected by the mirror 17 and traveling along the Y-axis direction. Incidentally, the microscope 18 may include a first microscope 18*b* for observing the end surface of the first optical fiber F1 and a second microscope 18*c* for observing the end surface of the second optical fiber F2. An example in which light is incident from the respective sides opposite to the end surfaces facing each other has been described above. However, the present invention is not limited to this example, and any method may be used as long as an amount of transmitted light or reflected light that allows the end surfaces to be observed can be obtained.

Figure 5:
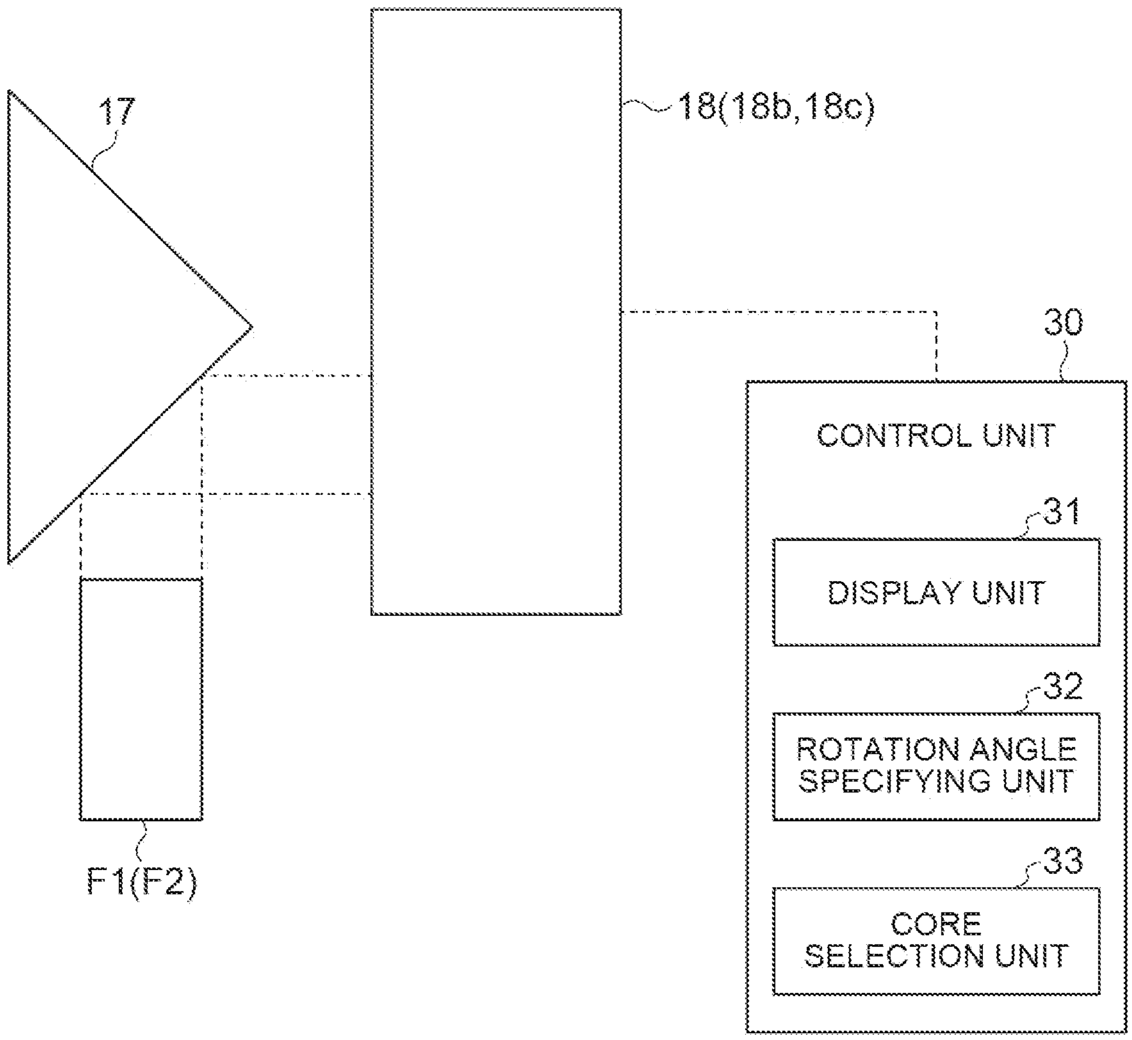
FIG. 5 is a block diagram for describing functions of the fusion splicer according to the embodiment.

FIG. 5 is a diagram schematically showing a positional relationship between the mirror 17, the first optical fiber F1 (or the second optical fiber F2), and the microscope 18. As shown in FIG. 5, the mirror 17 and an end portion of the first optical fiber F1 are disposed to face each other, and the mirror 17 and the microscope 18 are disposed to face each other. The microscope 18 observes the end surface of the first optical fiber F1 by receiving the light emitted from the first optical fiber F1 and reflected by the mirror 17. Incidentally, an example of a mirror having two reflection surfaces has been described above; however, the present invention is not limited to this example. Instead of the mirror 17, a mirror having a reflection surface only on one surface may be provided. The mirror may be capable of appropriately changing the relative position of the end surface of the first optical fiber F1 (or the second optical fiber F2), the microscope 18, and the reflection surface.

The microscope 18 includes, for example, an objective lens and a camera. The camera is a charge-coupled device camera (CCD camera), a complementary metal oxide semiconductor camera (CMOS camera), or the like. The microscope 18 captures images of the first optical fiber F1 and the second optical fiber F2. The images of the first optical fiber F1 and the second optical fiber F2 captured by the microscope 18 are transmitted to a control unit 30 of the fusion splicer 1 as image data.

The fusion splicer 1 may include a mechanism capable of observing a side surface of the first optical fiber F1 (or the second optical fiber F2) separately from the image observation mechanism 16 or using the same as a part of the image observation mechanism 16. Even when the fusion splicer 1 includes a side surface image observation mechanism separately from the image observation mechanism 16, the images of the first optical fiber F1 and the second optical fiber F2 captured by the microscope may be transmitted to the control unit 30 of the fusion splicer 1 as image data.

For example, a central processing unit (CPU) made up of one or a plurality of integrated circuits (ICs) is used as the control unit 30. Functional elements (a display unit 31, a rotation angle specifying unit 32, and a core selection unit 33 to be described later) of the control unit 30 are executed by the CPU. The control unit 30 acquires the imaging results of the first optical fiber F1 and the second optical fiber F2 from the microscope 18 or another microscope in addition to the microscope 18, and the imaging results of the first optical fiber F1 and the second optical fiber F2 are stored in the control unit 30. The mirror 17 is retracted to a position where the mirror 17 does not interfere with fusion splicing of the first optical fiber F1 and the second optical fiber F2.

Figure 6:
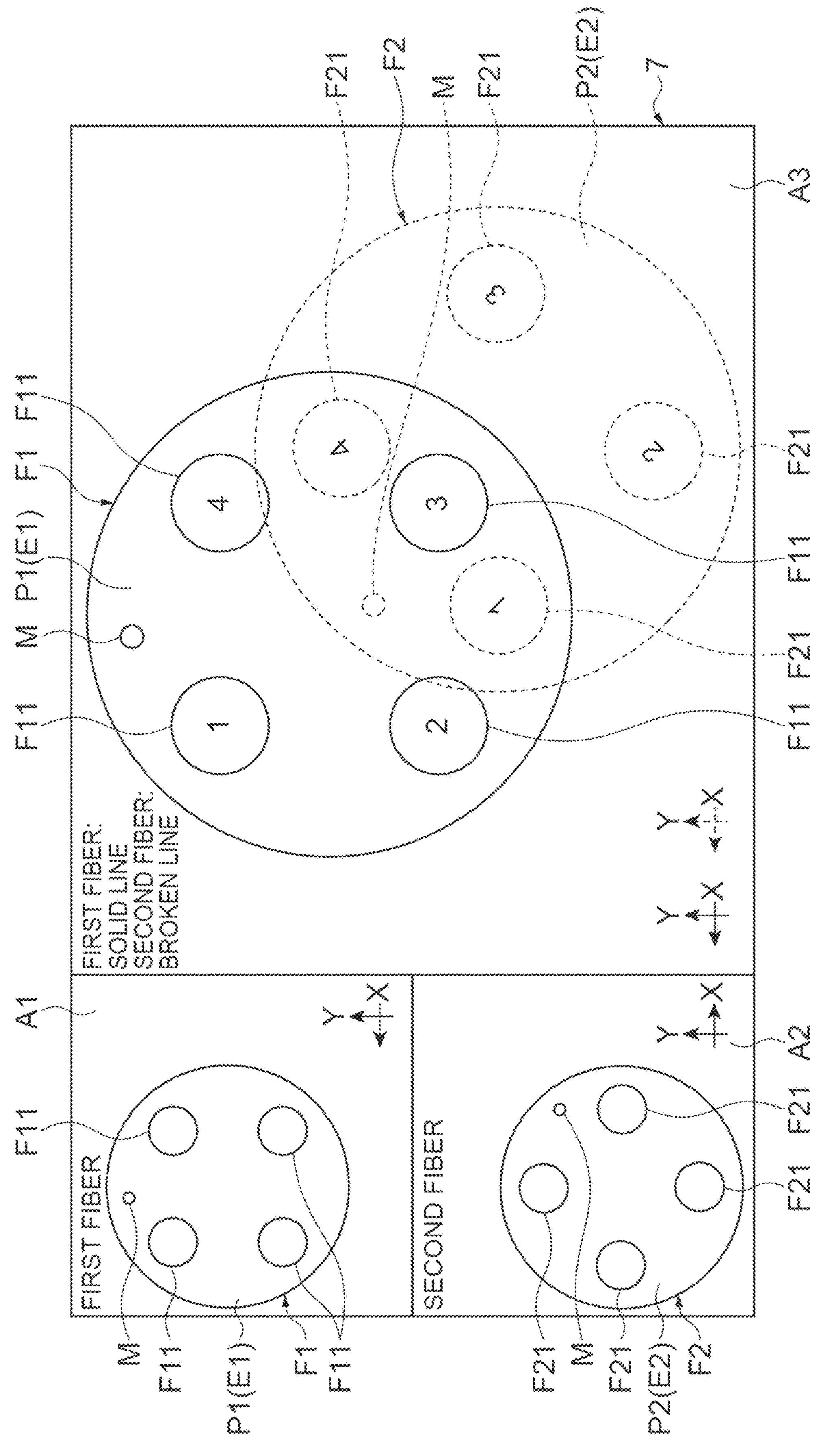
FIG. 6 is a view showing an example of an image displayed by a display unit of the fusion splicer according to the embodiment.

FIG. 6 is a view showing an example of imaging results of the respective end surfaces of the first optical fiber F1 and the second optical fiber F2. As shown in FIG. 6, for example, the first optical fiber F1 is a multicore fiber including n first cores F11, and the second optical fiber F2 is a multicore fiber including n second cores F21. n is a natural number of 2 or more. As one example, the first optical fiber F1 is a multicore fiber including four first cores F11, and the second optical fiber F2 is a multicore fiber including four second cores F21.

The control unit 30 includes the display unit 31 that displays a first image P1 of the first end surface E1 of the first optical fiber F1 and a second image P2 of the second end surface E2 of the second optical fiber F2 on the monitor 7. For example, the display unit 31 displays the states of the first end surface E1 and the second end surface E2 in a first region A1, a second region A2, and a third region A3 of the monitor 7. For example, the first region A1 and the second region A2 are disposed to line up along a lateral direction (up-down direction in the figure) of the monitor 7 on one side in a longitudinal direction (right-left direction in the figure) of the monitor 7. The third region A3 is disposed on the other side in the longitudinal direction of the monitor 7.

The display unit 31 displays the first image P1 and the second image P2 in such a manner that the first image P1 is superimposed on the second image P2 in a distinguishable manner. "Displaying the first image and the second image in such a manner that the first image and the second image are superimposed in a distinguishable manner" means that the first image and the second image are displayed in a distinguishable manner by setting a display mode of the first image and a display mode of the second image to be different from each other. FIG. 6 shows an example in which the display unit 31 displays the first image P1 with solid lines and the second image P2 with broken lines. However, a method for "displaying the first image and the second image in such a manner that the first image and the second image are superimposed in a distinguishable manner" is not limited to the above example, and the display unit 31 may display one or both of the first image P1 and the second image P2 through transparency, translucency, color change, or binarization.

The display unit 31 displays the above-described X-axis and Y-axis together with the first image P1 and the second image P2. The display unit 31 may display the coordinate axes of the X-axis and the Y-axis, or may display the X coordinate value and the Y coordinate value of each position of the first end surface E1 and the second end surface E2 together with the first image P1 and the second image P2. The display unit 31 may correct at least one of the position of the first end surface E1 and the position of the second end surface E2, and display the first image P1 and the second image P2 after the position correction.

For example, the display unit 31 displays the first image P1 in the first region A1, displays the second image P2 in the second region A2, and displays a superimposed image of the first image P1 and the second image P2 in the third region A3. For example, the first image P1 of the first end surface E1 and the second image P2 of the second end surface E2 that are captured are displayed in the first region A1 and the second region A2, respectively, as they are. For example, the first image P1 of the first end surface E1 is displayed in the third region A3 as it is, and the second image P2 with the second end surface E2 inverted (with the direction in the X-axis direction reversed) is displayed.

Each of the first optical fiber F1 and the second optical fiber F2 includes a marker M. The display unit 31 displays the first image P1 and the second image P2 in such a manner that the respective rotational states of the first optical fiber F1 and the second optical fiber F2 can be seen by the markers M. The control unit 30 includes, for example, the rotation angle specifying unit 32, and the display unit 31 may display the first end surface E1 and the second end surface E2 rotated by the rotation angle specified by the rotation angle specifying unit 32. The rotation angle specifying unit 32 specifies, for example, a rotation angle about each of the center of the first end surface E1 and the center of the second end surface E2. However, the center of rotation may be changeable as appropriate, and may be, for example, the center of a clad, the center of a specified core, or the center of gravity of a polygonal shape formed by connecting the centers of a plurality of cores.

Figure 7:
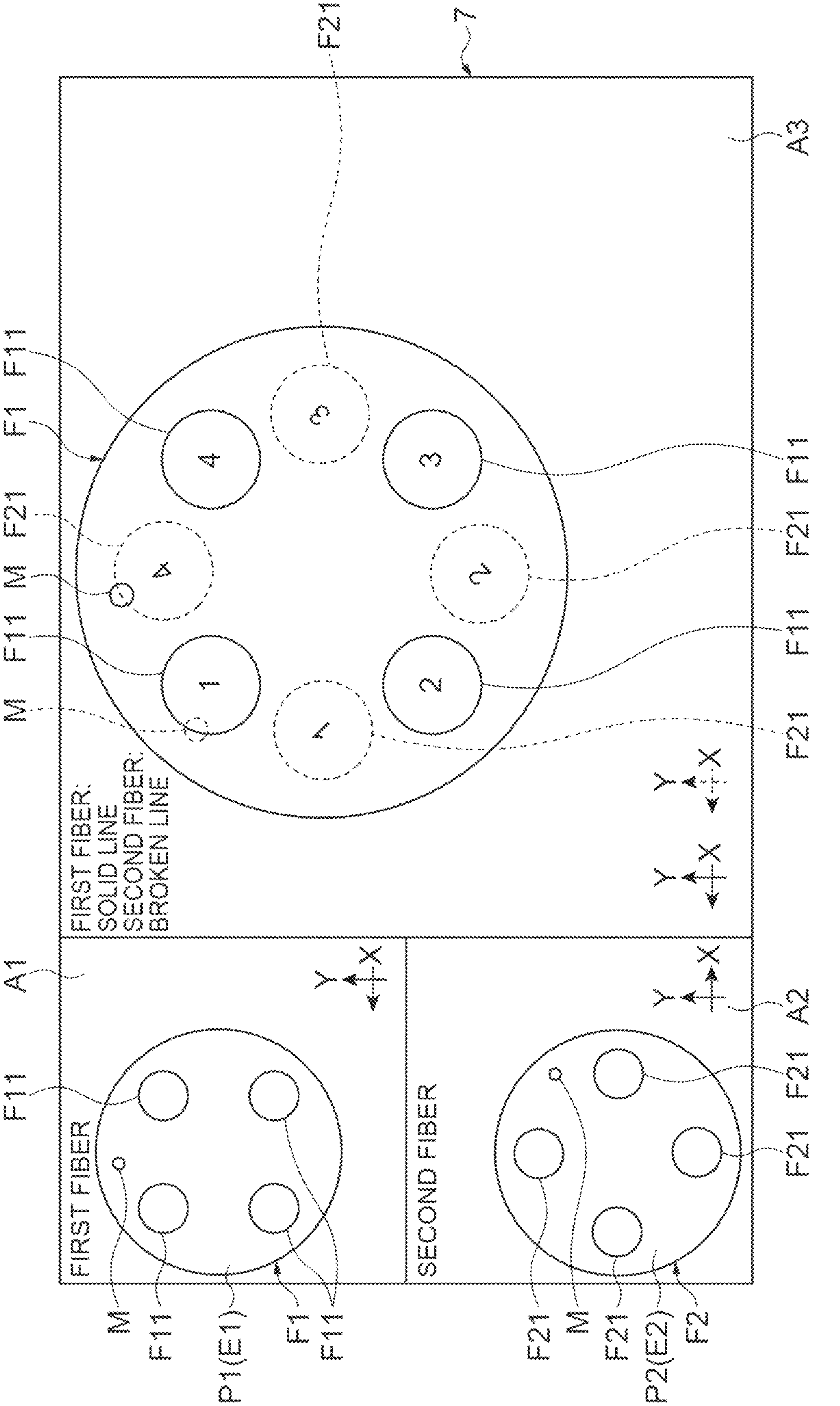
FIG. 7 is a view showing an example of an image displayed by the display unit of the fusion splicer according to the embodiment.

Hereinafter, various examples of display modes of the first image P1 and the second image P2 by the display unit 31 will be described. As shown in FIG. 7, the display unit 31 displays each number from 1 to n together with each of the n first cores F11, and displays each number from 1 to n together with each of the n second cores F21. For example, the control unit 30 recognizes the position of each first core F11 on the first end surface E1 and the position of each second core F21 on the second end surface E2 based on the positions of the markers M. The control unit 30 assigns a number to each of the first cores F11 and the second cores F21 according to the recognized positions of the first cores F11 and the recognized positions of the second cores F21. The display unit 31 displays the numbers assigned to each of the first cores F11 and the second cores F21, together with the first image P1 and the second image P2. FIG. 7 shows an example in which the display unit 31 displays the assigned number inside an each image of the first cores F11 and the second cores F21.

Figure 8:
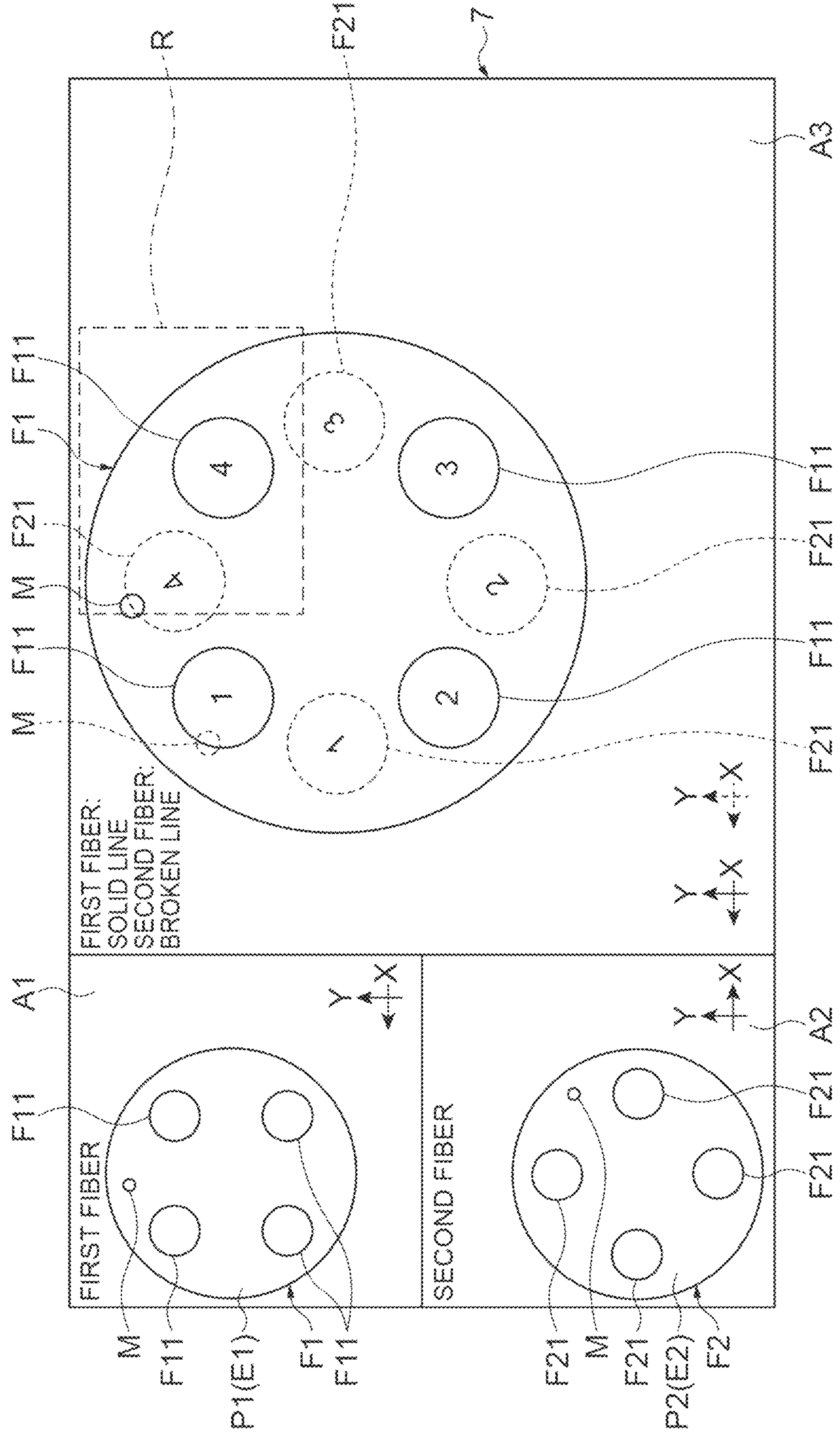
FIG. 8 is a view showing an example of an image displayed by the display unit of the fusion splicer according to the embodiment.
Figure 9:
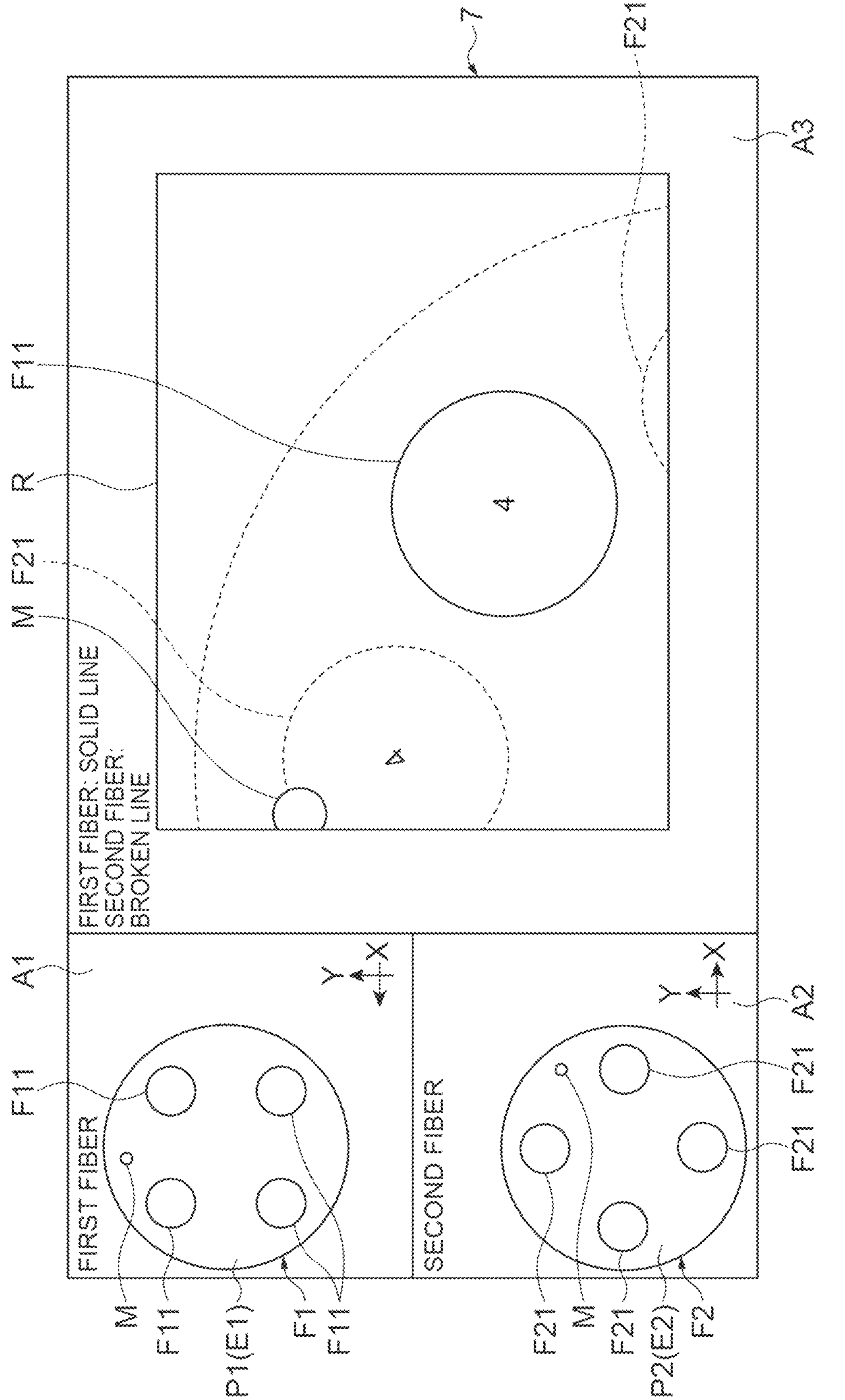
FIG. 9 is a view showing an example of an image displayed by the display unit of the fusion splicer according to the embodiment.
Figure 10:
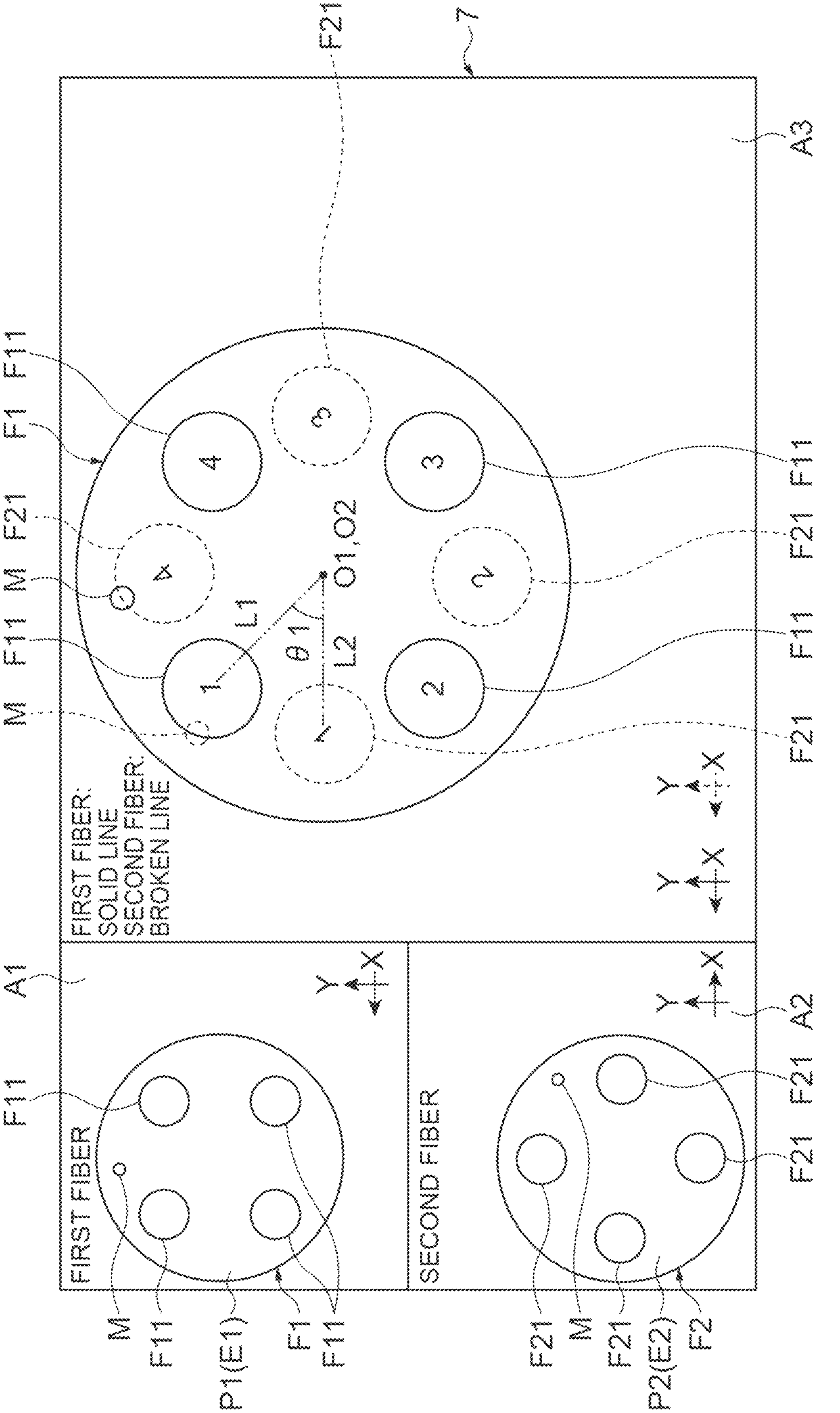
FIG. 10 is a view showing an example of an image displayed by the display unit of the fusion splicer according to the embodiment.

As shown in FIGS. 8 and 9, a specific location R may be selectable on a display screen of the monitor 7 by the display unit 31. The display unit 31 displays, for example, the selected specific location R in an enlarged manner. As shown in FIG. 10, the display unit 31 displays an angle θ1 formed by a line segment L1 connecting the first core F11 numbered x and a center O1 of the first end surface E1 and a line segment L2 connecting the second core F21 numbered x and a center O2 of the second end surface E2, in a state where a number is displayed on each image of the first cores F11 and the second cores F21. x is a natural number of 1 or more and n or less.

FIG. 10 shows an example in which the angle θ1 formed by the line segment L1 connecting the first core F11 numbered 1 and the center O1 and the line segment L2 connecting the second core F21 numbered 1 and the center O2 is displayed. The display unit 31 may display the angle θ1 formed by the line segment L1 connecting the first core F11 numbered i and the center O1 and the line segment L2 connecting the second core F21 numbered i and the center O2, and display an angle formed by a line segment connecting the first core F11 numbered j and the center O1 and a line segment connecting the second core F21 numbered j and the center O2. i is a natural number of 1 or more and n or less, and j is a value other than i and is a natural number of 1 or more and n or less.

Figure 11:
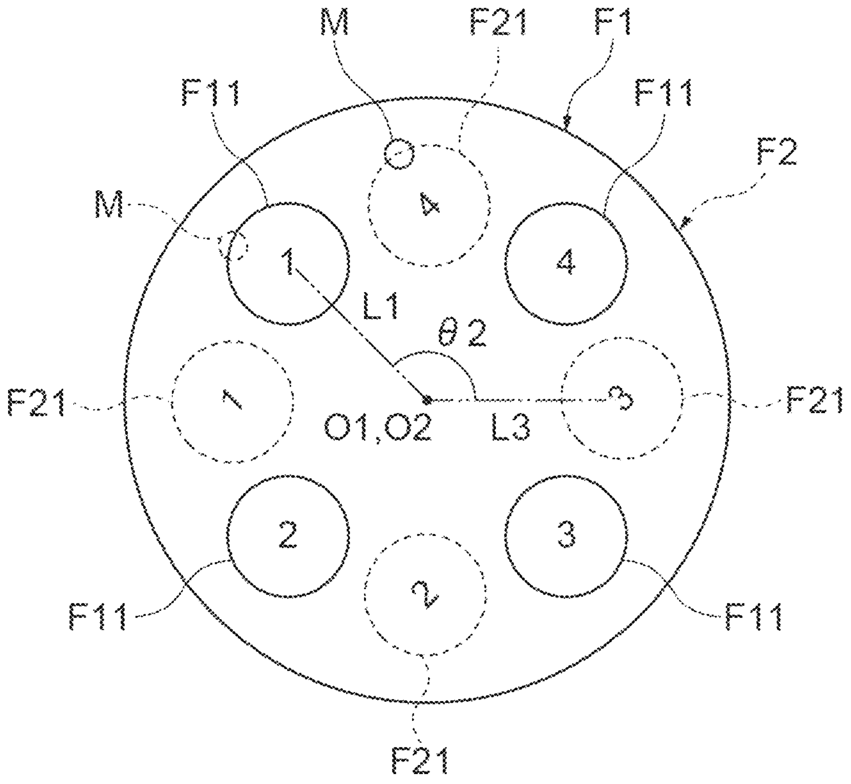
FIG. 11 is a view for describing number display and angle display of the fusion splicer according to the embodiment.

For example, the control unit 30 includes the core selection unit 33 that selects the second core F21 spliced to the first core F11 numbered X. As shown in FIG. 11, the display unit 31 may display an angle θ2 formed by the line segment L1 connecting the first core F11 numbered x and the center O1 of the first end surface E1 and a line segment L3 connecting the second core F21 selected by the core selection unit 33 and numbered y and the center O2 of the second end surface E2. y is a natural number of 1 or more and n or less.

FIG. 11 shows an example in which the angle θ2 formed by the line segment L1 connecting the first core F11 numbered 1 and the center O1 and the line segment L3 connecting the second core F21 numbered 3 and the center O2 is displayed. The display unit 31 may display the angle θ2 formed by the line segment L1 connecting the first core F11 numbered p and the center O1 and the line segment L3 connecting the second core F21 numbered q and the center O2, and display the angle θ2 for the first core F11 denoted by a number other than p and the second core F21 denoted by a number other than q. p is a natural number of 1 or more and n or less, and q is a value other than p and is a natural number of 1 or more and n or less.

Next, effects obtained from the fusion splicer 1 according to the present embodiment will be described. In the fusion splicer 1, the first end surface E1 of the first optical fiber F1 and the second end surface E2 of the second optical fiber F2 are fusion-spliced to each other. The fusion splicer 1 includes the first rotation mechanism 20A that rotates the first optical fiber F1 about the axis, and the second rotation mechanism 20B that rotates the second optical fiber F2 about the axis. The fusion splicer 1 includes the microscope 18 that captures images of the first end surface E1 of the first optical fiber F1 and the second end surface E2 of the second optical fiber F2. The fusion splicer 1 includes the display unit 31 that displays the first image P1 of the first end surface E1 and the second image P2 of the second end surface E2. The display unit 31 displays the first image P1 and the second image P2 in such a manner that the first image P1 is superimposed on the second image P2 in a distinguishable manner. Since the first image P1 and the second image P2 are displayed in such a manner that the first image P1 and the second image P2 are superimposed in a distinguishable manner, the positions of the first end surface E1 and the second end surface E2 can be accurately identified. By displaying the first end surface E1 and the second end surface E2 in such a manner that the first end surface E1 is superimposed on the second end surface E2, the positions of the first cores F11 of the first optical fiber F1 and the second cores F21 of the second optical fiber F2 can be easily recognized.

The display unit 31 may display the X-axis extending in a direction orthogonal to the axes and the Y-axis extending in a direction orthogonal to both the axes and the X-axis, together with the first image P1 and the second image P2. In this case, the positions in the X-axis direction and the positions in the Y-axis direction of the first cores F11 of the first optical fiber F1 and the second cores F21 of the second optical fiber F2 can be easily identified.

The display unit 31 may display the specified location R of the first image P1 and the second image P2 in an enlarged manner. In this case, since the display unit 31 displays the specified location R in an enlarged manner, the desired location R of the first cores F11 of the first optical fiber F1 and the second cores F21 of the second optical fiber F2 can be more clearly displayed.

The first optical fiber F1 may be a multicore fiber including n first cores F11, and the second optical fiber F2 may be a multicore fiber including n second cores F21. The display unit 31 may display each number from 1 to n together with each of the n first cores F11, and display each number from 1 to n together with each of the n second cores F21. In this case, since numbers from 1 to n are displayed together with the respective first cores F11, and numbers from 1 to n are displayed together with the respective second cores F21, the positions of the first cores F11 and the positions of the second cores F21 can be more easily recognized.

The display unit 31 may display the angle θ1 formed by the line segment L1 connecting the first core F11 numbered x and the center O1 of the first end surface E1 and the line segment L2 connecting the second core F21 numbered x and the center O2 of the second end surface E2. In this case, a deviation in the rotation position of the second cores F21 with respect to the first cores F11 can be identified from the displayed angle θ1. Therefore, the work of fusion-splicing the first optical fiber F1 and the second optical fiber F2 can be easily performed. It is possible to identify an angle by which the second optical fiber F2 should be rotated with respect to the first optical fiber F1 to allow the second core F21 numbered x to be spliced to the first core F11 numbered x.

The fusion splicer 1 may include the core selection unit 33 that selects the second core F21 spliced to the first core F11 numbered x. The display unit 31 may display the angle θ2 formed by the line segment L1 connecting the first core F11 numbered x and the center O1 of the first end surface E1 and the line segment L3 connecting the second core F21 selected by the core selection unit 33 and numbered y and the center O2 of the second end surface E2. In this case, the core selection unit 33 can select the second core F21 spliced to the first core F11 numbered x. The angle θ2 formed by the line segment L1 connecting the first core F11 numbered x and the center O1 of the first end surface E1 and the line segment L3 connecting the selected second core F21 numbered y and the center O2 of the second end surface E2 is displayed. Therefore, it is possible to identify an angle by which the second optical fiber F2 should be rotated with respect to the first optical fiber F1 to allow the second core F21 numbered y to be spliced to the first core F11 numbered x.

The fusion splicer 1 may include the rotation angle specifying unit 32 that specifies a rotation angle of the first end surface E1 about the center O1 of the first end surface E1. The display unit 31 may display the first end surface E1 rotated by the rotation angle specified by the rotation angle specifying unit 32. The display unit 31 may display the second end surface E2 rotated by the rotation angle specified by the rotation angle specifying unit 32. In this case, since the first image P1 or the second image P2 rotated by the specified rotation angle is displayed, the state of the first end surface E1 or the second end surface E2 after rotation can be identified before the first optical fiber F1 or the second optical fiber F2 is actually rotated.

The fusion splicer 1 according to the embodiment has been described above. However, the present invention is not limited to the embodiment described above. Those skilled in the art easily recognize that various modifications and changes can be made to the present invention within the scope of the concept described in the claims. The configuration of each part of the fusion splicer can be changed as appropriate within the scope of the concept. The shape, size, number, material, and disposition mode of each part of the fusion splicer according to the present disclosure are not limited to the embodiment described above, and can be changed as appropriate. For example, the display mode of a superimposed image of the first image P1 and the second image P2 by the display unit 31 is not limited to the embodiment described above, and can be further changed.

Figure 12:
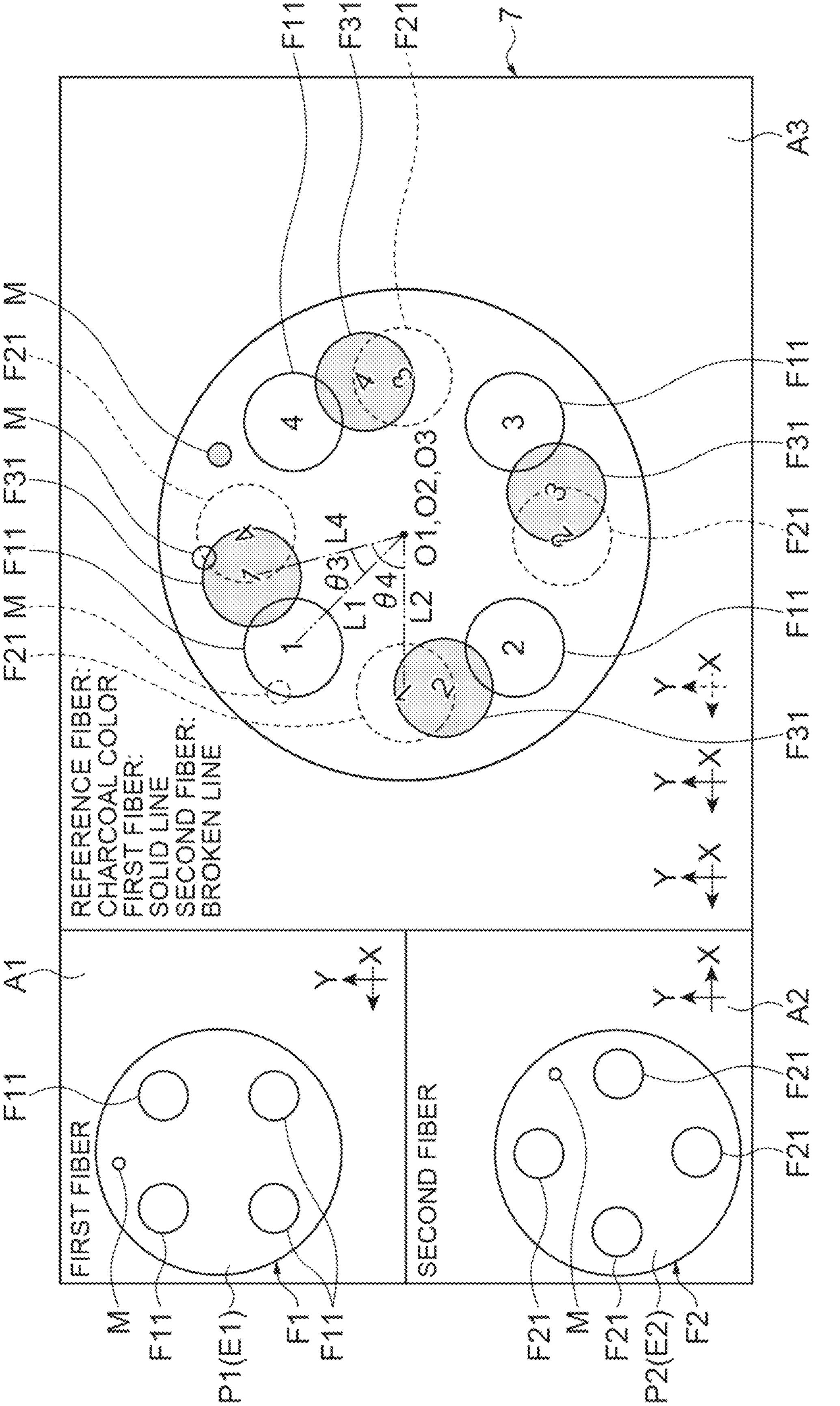
FIG. 12 is a view showing an example of an image displayed by the display unit of the fusion splicer according to the embodiment.

As shown in FIG. 12, the display unit 31 may display an image of an end surface of a reference optical fiber serving as a reference, in addition to a superimposed image of the first end surface E1 and the second end surface E2. The reference optical fiber is an optical fiber serving as a reference for rotational alignment of the first optical fiber F1 and the second optical fiber F2, and has an end surface on which the same number of reference optical fiber cores F31 as the first optical fiber F1 and the second optical fiber F2 is formed. For example, information about the reference optical fiber is stored in the control unit 30 in advance.

The display unit 31 may display, for example, an angle θ3 formed by the line segment L1 connecting the first core F11 numbered x and the center O1 of the first end surface E1 and a line segment L4 connecting the reference optical fiber core F31 numbered x and a center O3 of the end surface of the reference optical fiber. The display unit 31 may display an angle θ4 formed by the line segment L2 connecting the second core F21 numbered x and the center O2 of the second end surface E2 and the line segment L4. In this case, it is possible to identify an angle by which each of the first optical fiber F1 and the second optical fiber F2 should be rotated to align the first optical fiber F1 and the second optical fiber F2 with the rotation position of the reference optical fiber.

REFERENCE SIGNS LIST

1: fusion splicer, 2: windshield cover, 3: housing, 4: fusion splicing unit, 5: heater, 7: monitor, 8: power switch, 9: splicing start switch, 10A: first optical fiber holder, 10B: second optical fiber holder, 11: V-groove, 12: stand, 13: lid, 15: discharge electrode, 16: image observation mechanism, 17: mirror, 18: microscope, 18*b*: first microscope, 18*c*: second microscope, 20A: first rotation mechanism, 20B: second rotation mechanism, 30: control unit, 31: display unit, 32: rotation angle specifying unit, 33: core selection unit, A1: first region, A2: second region, A3: third region, E1: first end surface, E2: second end surface, F1: first optical fiber, F2: second optical fiber, F11: first core, F21: second core, F31: reference optical fiber core, L1, L2, L3, L4: line segment, M: marker, O1, O2, O3: center, P1: first image, P2: second image, R: location, θ1, θ2, θ3, θ4: angle.

What is claimed is:

1. A fusion splicer that fusion-splices a first end surface of a first optical fiber and a second end surface of a second optical fiber to each other, wherein an axis of the first optical fiber coincides with an axis of the second optical fiber, the fusion splicer comprising:

a first rotation mechanism that rotates the first optical fiber about the axis;

a second rotation mechanism that rotates the second optical fiber about the axis;

a microscope that captures images of the first end surface and the second end surface; and a display unit that displays a first image of the first end surface captured by the microscope and a second image of the second end surface captured by the microscope in such a manner that the first image is superimposed on the second image in a distinguishable manner, wherein the first image of the first end surface is displayed as it is, and the second image with the second end surface inverted is displayed in the display unit.

2. The fusion splicer according to claim 1, wherein the display unit displays an X-axis extending in a direction orthogonal to the axes and a Y-axis extending in a direction orthogonal to both the axes and the X-axis, together with the first image and the second image.

3. The fusion splicer according to claim 1, wherein the display unit displays a specified location of the first image and the second image in an enlarged manner.

4. The fusion splicer according to claim 1, wherein the first optical fiber is a multicore fiber including n first cores, where n is a natural number of 2 or more, the second optical fiber is a multicore fiber including n second cores, and the display unit displays each number from 1 to n together with each of the n first cores, and displays each number from 1 to n together with each of the n second cores.

5. The fusion splicer according to claim 4, wherein the display unit displays an angle formed by a line segment connecting the first core numbered x and a center of the first end surface and a line segment connecting the second core numbered x and a center of the second end surface, where x is a natural number of 1 or more and n or less.

6. The fusion splicer according to claim 4, further comprising:

a core selection unit that selects the second core spliced to the first core numbered x, where each of x and y is a natural number of 1 or more and n or less, wherein the display unit displays an angle formed by a line segment connecting the first core numbered x and a center of the first end surface and a line segment connecting the second core selected by the core selection unit and numbered y and a center of the second end surface.

7. The fusion splicer according to claim 1, further comprising:

a rotation angle specifying unit that specifies a rotation angle of the first end surface about a center of the first end surface, wherein the display unit displays the first end surface rotated by the rotation angle specified by the rotation angle specifying unit.

8. A fusion splicer that fusion-splices a first end surface of a first optical fiber and a second end surface of a second optical fiber to each other, wherein an axis of the first optical fiber coincides with an axis of the second optical fiber, the fusion splicer comprising:

a first rotation mechanism that rotates the first optical fiber about the axis;

a second rotation mechanism that rotates the second optical fiber about the axis;

a microscope that captures images of the first end surface and the second end surface; and a display unit that displays a first image of the first end surface captured by the microscope and a second image of the second end surface captured by the microscope in such a manner that the first image is superimposed on the second image in a distinguishable manner, wherein the display unit includes a monitor that displays a superimposed image of the first image with the second image inside the monitor, the superimposed image having a size large enough to distinguish the first image from the second image.

9. A fusion splicer that fusion-splices a first end surface of a first optical fiber and a second end surface of a second optical fiber to each other, wherein an axis of the first optical fiber coincides with an axis of the second optical fiber, the fusion splicer comprising:

a first rotation mechanism that rotates the first optical fiber about the axis;

a second rotation mechanism that rotates the second optical fiber about the axis;

a microscope that captures images of the first end surface and the second end surface; and a display unit that displays a first image of the first end surface captured by the microscope and a second image of the second end surface captured by the microscope in such a manner that the first image is superimposed on the second image in a distinguishable manner, wherein the display unit includes a monitor, and the monitor is divided into a first region that displays the first image only, a second region that displays the second image only, and a third region that displays a superimposed image of the first image with the second image.

* * * * *